Sept. 19, 1972          W. R. WEAVER          3,692,551

CORE FOR USE IN PRESSURE MOLDING

Filed Feb. 24, 1970          2 Sheets-Sheet 1

INVENTOR
William R. Weaver
BY Collins & Oberlin
ATTORNEYS

INVENTOR.
William R. Weaver
BY
Collins & Oberlin
ATTORNEYS

United States Patent Office 3,692,551
Patented Sept. 19, 1972

3,692,551
CORE FOR USE IN PRESSURE MOLDING
William R. Weaver, Toledo, Ohio, assignor to Libbey-Owens-Ford Company, Toledo, Ohio
Filed Feb. 24, 1970, Ser. No. 13,703
Int. Cl. B28b 7/34
U.S. Cl. 106—38.3                                   3 Claims

ABSTRACT OF THE DISCLOSURE

This application discloses core structures that exhibit strength and a hard, ceramic-like surface finish; methods of producing the same which involve mixing particles of core materials, and/or coating core shapes, with molten salts or mixtures thereof; and methods of injection molding plastic articles around such cores.

BACKGROUND OF THE INVENTION

Field of the invention

The invention relates broadly to cores of the type commonly employed in the foundry and molding arts. More particularly it has to do with improved cores of this general character that are especially adapted for use in connection with the injection and/or compression molding of plastics, and with methods of producing and using such cores.

Description of the prior art

Cores, as such, are of course old and well known. As originally used in foundry practice they were probably employed only for making hollow metal castings and, as the name suggests, acted to shape the inside or core of the castings. Today, however, cores are used in a wide variety of different ways and for many purposes.

Nevertheless foundry aggregates such as sand are still among the best known core materials although most present day cores also contain special binders and are usually baked or otherwise treated to render them strong enough to be handled and to resist forces exerted by the metal, plastic or other material being cast or molded. These are commonly called dry-sand cores and, when they are of shapes that cannot be detruded, their composition and structure is such to permit them to be broken up for removal from the finished casting or molded article. Also it is conventional to apply washes or coatings to cores to prevent their fusing to the casting and/or to improve surface smoothness.

As core binders, water, linseed oil, materials containing dextrine and starch, natural and synthetic resins, plastics, bentonite, and portland cement are quite commonly used; and materials employed for core washes include fine graphite, silica, mica, zircon flour, and rubber-based chemical sprays.

However cores that have heretofore been available and the known procedures for producing and treating them have been found to have a number of deficiencies and shortcomings, particularly when employed in connection with some of the more sophisticated practices that have evolved in the injection molding of plastics.

SUMMARY

Accordingly, it is a primary object of this invention to provide cores with improved structural and working characteristics; improved methods of producing such cores; and special plastic molding techniques involving their use.

Another object is the provision of high strength, hard, smooth surfaced cores that are readily dispersible from any molded article.

Another object is to provide methods of producing such cores by treating and/or combining inert, particulate core materials, with molten salt.

Still another object is the provision of a method of producing plastic articles which involves injection molding the article around a core having at least a surface area thereof composed of a hardened molten salt.

Further objects and advantages of the invention will become apparent during the course of the following description when taken in connection with the accompaying drawings.

BRIEF DESCRIPTION OF THE DRAWINGS

In the drawings, wherein like numerals are employed to designate like parts throughout.

DESCRIPTION OF THE PREFERRED EMBODIMENTS

This invention may be said to be based on the discovery that the molding of plastics requires particular structures and properties in cores employed therein; that adequate core structures and properties produce improved articles of molded plastic; and that cores which embody hardened molten salts, either as coatings on or in a mixture with inert particles of core materials, possess structures and properties well suited for all kinds of plastic molding.

Figure 1:
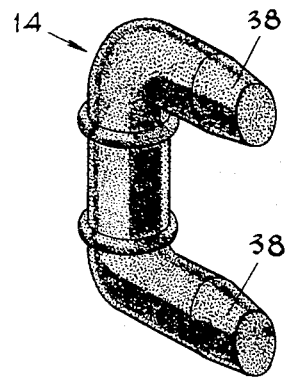
FIG. 1 is a perspective view of an illustrative type of core produced in accordance with the invention.

For example, the cores of the present invention are strong and hard enough to resist tendencies toward structural breakage and/or particle disintegration that are inherent under the extreme pressure and temperature conditions encountered in ejection molding. At the same time they exhibit a remarkably smooth, porcelain-like surface finish that successfully resists unwanted plastic penetration. Consequently articles can be injection molded around these cores from a wide range of plastic materials, to produce a wide variety of shapes and with passages or interval cavi- Referring now more particularly to the drawings there is illustrated in FIG. 1 a particular shape of core designed for use in producing a molded article of plastic of a character that requires negligible shrinkage in the mold and a water tight, smooth walled passageway therethrough.

In making the cores, practically any metal salt or mixtures of salts can be used that is adaptable to the conditions to be encountered in the subsequent casting or molding procedures in which the cores are to be used and that will not interfere with or adversely affect the core producing procedures of melting the salt and combining it with inert, particulate core materials.

Thus the salt or salt mixture must have a melting point that is low enough to make it commercially practical to melt but high enough to resist the molding or casting temperatures to which it will be exposed. Preferably it should also be soluble in some conventional liquid solvent, be non-toxic, have good wetting properties, and be reasonable in price.

Because of this nitrates and nitrites are desirable because of their ready solubility in water; however the chlorides, while less water soluble, are generally less expensive; but the others, including sulfates and carbonates may fit into particular situations; and eutectic salt mixtures present many possibilities.

For example, the melting point for sodium nitrate is 590° F. and for potassium nitrate is 638.6° F. However a mixture of substantially equal parts of sodium and potassium nitrates has a melting point of only 428° F., with a working range of approximately 480 to 1100° F. Moreover the cost of such a mixture can be lowered and the melting point easily raised by reducing the amount of potassuim while, by substituting nitrites or using nitrate-nitrite mixtures substantially lower melting points can be attained.

Returning again to the drawings, the core 14 illustrated in FIG. 1 is a representative form of non-detrudable core that can be produced in accordance with the invention. Following one and perhaps the simplest procedure, a core body 15 (FIG. 2) of the proper shape but slightly smaller than desired is formed in a conventional manner using sand or other inert granular material or aggregate with a suitable water soluble binder such as sodium silicate. This undersized core is then supported by wires or other suitable means 16 and dipped into a heated pot 17 containing a bath of molten salt 18 for a length of time sufficient to condition the surface and form a coating 19 (FIG. 3) on the body portion 15 that is of sufficient thickness to bring it to the required dimensions.

In actual practice coatings .010" thick have been arrived at by immersions of approximately 3 seconds and, upon removal from the molten salt bath the core body was completely covered with a uniform coating of hardened salt that provided a damage resistant skin having a hard, smooth surface finish of a porcelain like quality.

However, in situations where high strength cores that are compression resistant throughout are necessary a somewhat different core making procedure is employed. In this, the molten salt is combined by mixing it with the inert, particulate material and the complete core is cast or otherwise formed from this mixture. The salt can of course be melted in any suitable container and mixed in the same or a different one. Also it may be convenient to melt the salt and mix it with the inert material in an electrically heated container, such as shown at 20 in FIG. 4, which can then be used to pour or cast the mixture into a core mold 21. In making non-detrudable cores, the mold 21 is preferably of the hinged or other split variety so that it can be opened as illustrated in FIG. 5 to permit removal of the finished core 22 and one of the advantages of these cast cores is that they set up so rapidly that the mold can be opened almost immediately after pouring and the core removed therefrom.

As indicated above the kind of salt or salt mixture to be used depends on the properties and structure required in the finished core. Similarly, the inert, particulate material employed may be such common granular materials as sand or other foundry aggregates, or they may be such different ones as glass or metal beads, shot or pellets; or indeed particles that are neither round nor granular in shape as well as particles of various sizes.

With sand as the inert material, substantially equal mixtures of said and salt seem to work well in most cases but, again, these proportions can be rather widely manipulated to control the structure and properties of the cores, and differences in the size and shape of the inert particles may require a compensation in proportions to achieve a given result.

Figure 3:
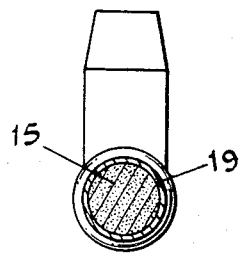
FIG. 3 is a typical cross section through a core produced as illustrated in FIG. 2.

In any event, however, the mixting of the inert particles with the molten salt results in each of the particles being coated with salt and, in the finished article, with the core being provided with what appears to be a continuous skin of hardened molten salt that is substantially the same as that exhibited by the coating 19 of FIG. 3.

Cores produced as described in connection with FIGS. 1 to 5 may be used in connection with such high temperature and pressure situations as encountered in the die casting of metals as well as in the injection molding of plastics and are as well adapted to the recent and more sophisticated techniques as to the convention procedures.

Figure 6:
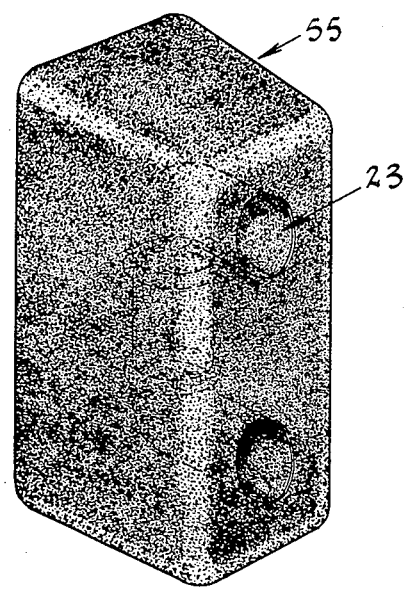
FIG. 6 is a perspective view of a plastic article to be produced with the core of FIG. 1.

For example, to produce a plastic article as shown in FIG. 6 requires a core as illustrated in FIG. 1 to produce the substantially C shaped fluid passageway 23 that runs therethrough. However the structure of the article and the fact that its specification provides only a minimal shrinkage tolerance in the mold renders it impractical if not impossible to produce it by ordinary plastic molding procedures.

Figure 7:
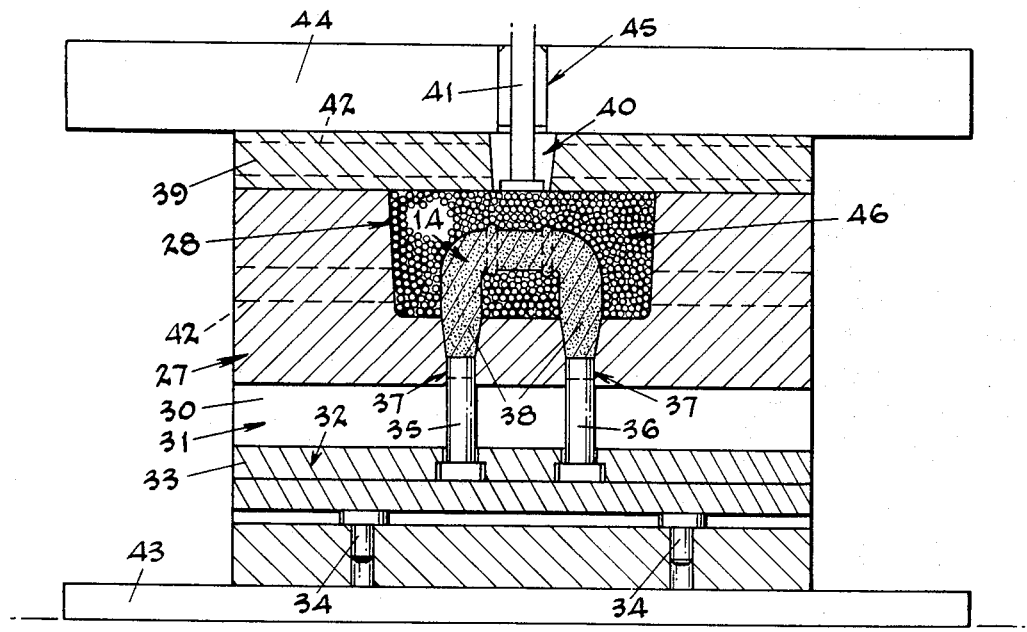
FIG. 7 is a longitudinal, vertical, sectional view through an apparatus for incorporating the core of FIG. 1 into a self-sustaining preform or skeleton type matrix for the molded plastic article of FIG. 6.

Nevertheless it can be readily and accurately produced by a special procedure which involves the use of one of the cores of this invention. Specifically this is carried out by first mounting a core produced by either of the procedures illustrated in FIGS. 2 to 5, within a porous preform, or skeleton matrix, and one form of apparatus that can be used for the purpose is illustrated in FIG. 7.

This apparatus comprises a mold member 27, having an open mold cavity 28 of the shape and size desired for the preform, and which is supported on a base plate by means of blocks 30 that are spaced apart as at 31 to permit positioning of a core supporting and locating device 32 therebetween. The device 32 includes an elongated bar 33 positioned within the space 31 by pins 34, and core support rods 35 and 36 extending upwardly from the bar 33 and fitting into the lower ends of openings 37 in the bottom of the mold 27 that are shaped at their upper ends to receive tapered extensions 38 on the core 14.

The mold 27 is provided with a cover 39, located to cover the mold opening or cavity 28 and provided with an opening 40 to receive a conduit 41 for introducing a gaseous medium into the cavity 28. The mold is also adapted to be heated to any desired degree as by resistance heating elements 42 located in the mold body and/or in the cover therefor.

In use a core 14 is located in the mold opening 28 of the mold 27 by means of the device 32 while the entire apparatus is supported on a platen 43. A preform or skeleton matrix may then be prepared by a so-called "cold" process, i.e., at room temperature, by first assembling a supply of particles, such as substantially spherical metal pellets of random sizes approximately $\frac{1}{16}$ to $\frac{1}{8}$ of an inch in diameter, and mixing them in a container with sodium silicate in a proportion of 100 parts by weight of pellets to between 3 and 5 parts by weight of sodium silicate which is sufficient to act as an adhesive to bind all of the particles together. This mixture is then poured into the mold cavity 28, around the core 14 and compacted or tightly packed at a pressure of around 5 p.s.i. to completely fill the cavity.

Next the cover 39 is placed on the mold 27 and held in place by an upper platen 44 having a central opening 45 therein for the conduit 41. $CO_2$ gas is forced through the conduit into the cavity 28 and around and through the contacting coated particles therein, and maintained for 60 seconds or until the sodium silicate adhesive has set up to produce a rigid, self-sustaining and substantially incompressible porous preform 46.

The preform 46, with the core 14 mounted therein is then inserted into the mold cavity 47 (FIGS. 8 and 9) of a plastic injection molding machine 48 which, for example, may be of the horizontal screw ram type.

The machine 48 is then operated to inject a plastic impregnant through a feed passage 49, in the closure plate 50 (FIGS. 8 and 9), branch passages 51 and 52 formed by cooperating grooves in the plate 50 and mold face 53, and then through similarly formed passages or gate openings 54 into the pores or interstices of the preform 46 within the mold cavity 47. Thereafter the injected plastic material solidifies and hardens in the cavity 47 to produce a filled plastic article 55 (FIG. 6).

Obviously the self-supporting porous, skeleton matrix employed in this special molding technique can be produced by a "hot" as well as by the "cold" process described. Also a mold supported skeleton matrix can be provided and used by initially locating the core 14 alone in the mold cavity 47 and then filling the cavity with loose matrix particles before closing the mold and injecting the plastic.

Figure 10:
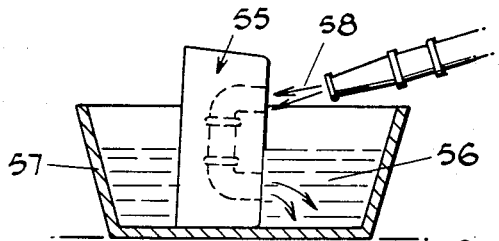
FIG. 10 is a diagrammatic illustration of one way in which the core of the invention can be dispersed from a molded plastic article.

In any event, with a soluble type core in the molded plastic article, the core material or binder can be quite readily removed from the article with water or a weak acid. For example with a core in which both the hardened salt binder and skin are water soluble, the impregnated matrix 55 with the core 14 intact can be placed in a bath of water 56 in a container or tank 57 as shown in FIG. 10 and a stream of water 58 employed, with the bath 56, to dissolve the binder and flush the core material from the article. With this procedure the shape of the core is destroyed within the article and the destruction product or core material dispersed therefrom.

Acids are of course not usable in all situations, but a small amount of a carbonate or bicarbonate salt in the core mixture will facilitate removal when the core can be subjected to a dilute acid solution, because the reaction of the carbonate or bicarbonate with the acid will generate carbon dioxide and so cause more rapid disintegration. Alternatively, the salt bound and/or coated sand cores can be destroyed and dispersed by mechanically vibrating the article.

The cores of this invention are remarkably suited for use in the special type of injection molding just described and they can be readily adapted not only to meet the wide variety of conditions encountered in it but also to take advantage of whatever procedural peculiarities may exist. Thus, salts can be selected with temperature and pressure tolerances dependent on the kind of resin or plastic to be injected and also on the structure and composition of the skeleton matrix. At the same time, with this technique, salts with relatively lower melting temperatures can be used in cores for articles of relatively high temperature resins because the skeleton matrix acts as a heat sink to rapidly lower the temperature of the flowing incoming plastic and can also be designed to affect the pressures exerted on the core.

Nevertheless the cores of the invention are also important in what may be termed direct injection molding. Moreover, regardless of the specific kind of injection molding employed with the cores of the invention, cavities or passages in the finished plastic articles that are formed thereby will be remarkably smooth walled and generally fluid tight.

For a more detailed understanding of certain phases of the invention here described there are set forth below certain specific examples illustrating the manner in which the principles thereof have been applied to particular problems.

EXAMPLE I

Figure 4:
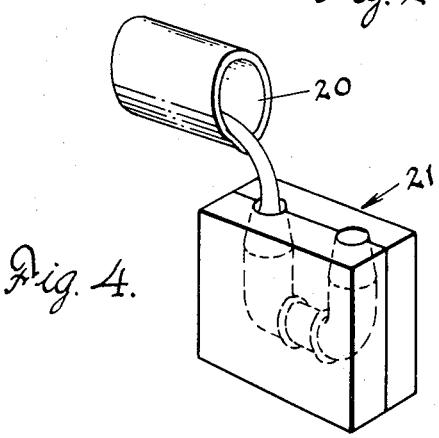
FIG. 4 is a diagrammatic view showing the pouring of a core such as that shown in FIG. 1.
Figure 5:
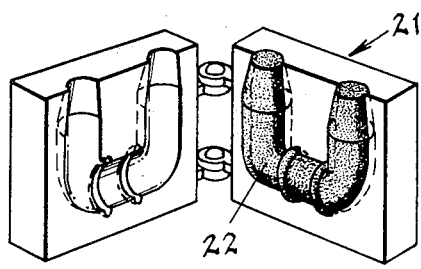
FIG. 5 is a view showing the mold of FIG. 4 open to permit removal of the core.

In producing the article of FIG. 6 in a size roughly 2 x 2 x 4 inches, a core member shaped as shown in FIG. 1 was made up by intimately mixing foundry sand having a grain size of around 300 mesh with approximately equal parts of a substantially 50–50 mixture of molten sodium and potassium nitrates at a temperature between 425 and 550° F. and casting said mixture in a split mold, heated to between 140 and 175° F., as shown in FIG. 4.

Figure 8:
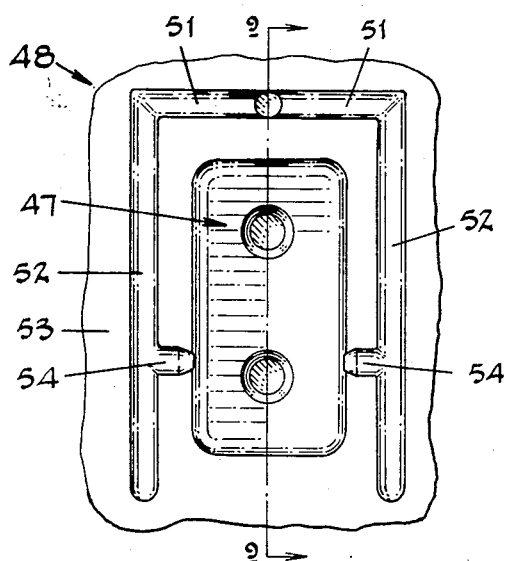
FIG. 8 is a fragmentary sectional view looking into the mold cavity of a horizontal type injection molding machine with the skeletal matrix of FIG. 7 therein.
Figure 9:
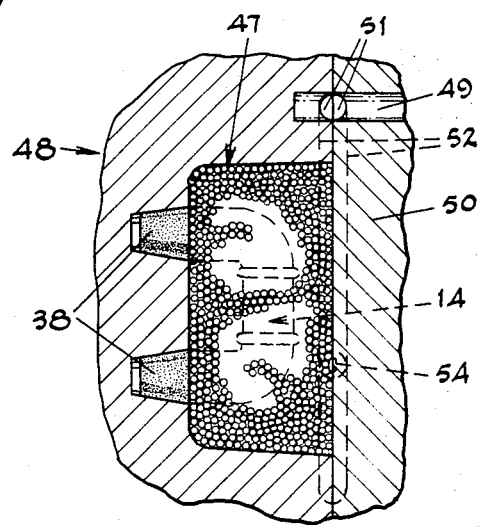
FIG. 9 is a vertical sectional view taken substantially along the line 9—9 in FIG. 8.

The resulting core was mounted in a skeleton matrix made up of aluminum pellets by the cold method described in connection with FIG. 7 and the resulting matrix-core assembly then heated to approximately 150° F. to facilitate plastic flow therethrough before locating it in the mold cavity of an injection molding machine as illustrated in FIGS. 8 and 9.

Nylon resin at a temperature of 400° F. and a pressure of 15,000 p.s.i. was then injection molded into the pores of the skeleton matrix and around the core as described above. After 30 seconds the nylon had cooled sufficiently to solidify, whereupon the molded article was removed from the machine and the core dispersed and flushed out as described in connection with FIG. 10.

EXAMPLE II

Figure 2:
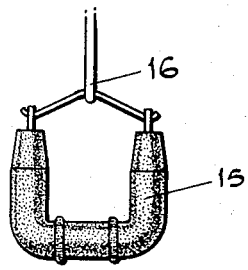
FIG. 2 is a diagrammatic view illustrating one way of applying a salt coating in the production of a core such as shown in FIG. 1.
Figure 2:
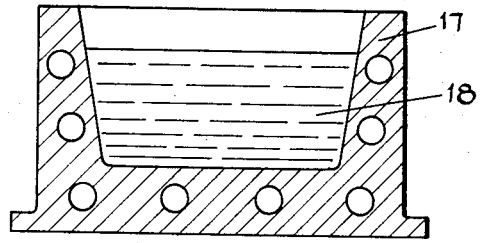

A similar article was produced in the same way except that first an undersized core was made up of sand grains bound together with sodium silicate and permeated with $CO_2$. This somewhat porous and undersized core was then dipped, as shown in FIG. 2, into a mixture of molten sodium nitrate and sodium nitrite, maintained at a temperature somewhat above its melting point of approximately 280° F., to seal the core, increase its size to the desired dimensions and provide a smooth, hard porcelain-like skin at its outer surface.

The coated core was then mounted in a skeleton matrix as described above and the matrix or preform injection molded in the same way but employing polystyrene resin at an injection temperature of approximately 400° F. and pressure of around 12,000 p.s.i.

This example demonstrates how, with this special molding technique, a relatively high injection temperature can be employed with a core that is bound and/or coated with salt having a relatively low melting point due to the heat sink action of the matrix and flash chilling at the core-resin interface.

EXAMPLE III

A core similar to that of Example II, but for use with higher temperature molding or casting materials, was produced by dipping a porous, undersized adhesive bound sand core body into a molten sodium nitrate-sodium nitrite salt mixture having a melting point of around 500 to 600° F.

EXAMPLE IV

Still another core of this general character was produced by dipping a core body composed of adhesive bound particles of inert material into a molten eutectic mixture of sodium, potassium and lithium nitrate. The resulting coating was extremely hard and smooth.

However it is to be understood that the invention can as well be applied to other generally, and specifically different problems, situations and environments. In this connection the cores of the invention may be used in a variety of forms of metal casting as well as of plastic molding; in compression as well as in injection molding; and in the molding of both thermoplastic and thermosetting resins, requiring a wide variety of temperature and pressure conditions. Indeed, the forms of the invention herewith shown and described are to be taken as illustrative embodiments only of the same, because various changes in the shape size and arrangement of parts as well as various procedural and compositional changes may be resorted to without departing from the spirit of the invention as defined in the following claims.

I claim:

1. As a new article of manufacture, a core for use in high temperature and pressure molding made up entirely of particles of inert core material, each of which is intimately mixed and covered with hardened molten salt that acts to coat said particles, bind the same together and maintain them within a shaped predetermined form.

2. An article as defined in claim 1, in which said mixture of inert particles and hardened molten salt also includes a carbonate as an additional constituent.

3. An article as defined in claim 1, in which said inert particles are sand, and said molten salt is a mixture of sodium and potassium nitrates.

References Cited

UNITED STATES PATENTS

| | | | |
|---|---|---|---|
| 3,501,320 | 3/1970 | Pietryka et al. | 106—38.3 X |
| 3,459,253 | 8/1969 | Woolcott | 249—61 X |

H. A. KILBY, JR., Primary Examiner

U.S. Cl. X.R.

106—38.9; 249—61, 134